United States Patent
Furthmann

(10) Patent No.: US 9,162,821 B2
(45) Date of Patent: Oct. 20, 2015

(54) BUCKET ELEVATOR ARRANGEMENT WITH AT LEAST THREE SEPARATELY OPERATED BUCKET ELEVATOR STRANDS

(71) Applicant: AUMUND FORDERTECHNIK GMBH, Rheinberg (DE)

(72) Inventor: Reiner Furthmann, Rheinberg (DE)

(73) Assignee: AUMUND FORDERTECHNIK GMBH, Rheinberg (DE)

( * ) Notice: Subject to any disclaimer, the term of this patent is extended or adjusted under 35 U.S.C. 154(b) by 0 days.

(21) Appl. No.: 14/362,088

(22) PCT Filed: Nov. 29, 2012

(86) PCT No.: PCT/EP2012/073927
§ 371 (c)(1),
(2) Date: May 30, 2014

(87) PCT Pub. No.: WO2013/079579
PCT Pub. Date: Jun. 6, 2013

(65) Prior Publication Data
US 2014/0311871 A1 Oct. 23, 2014

(30) Foreign Application Priority Data

Dec. 2, 2011 (DE) .......................... 10 2011 055 969

(51) Int. Cl.
*B65G 17/12* (2006.01)
*B65G 17/36* (2006.01)
*B65G 23/26* (2006.01)

(52) U.S. Cl.
CPC .............. *B65G 17/126* (2013.01); *B65G 17/36* (2013.01); *B65G 23/26* (2013.01)

(58) Field of Classification Search
CPC ....... B65G 17/126; B65G 17/36; B65G 23/26
USPC ................................................ 198/711, 712
See application file for complete search history.

(56) References Cited

U.S. PATENT DOCUMENTS 2,545,377 A * 3/1951 Parisi ............................. 198/705
2,987,165 A * 6/1961 Sheehan ....................... 198/708
(Continued)

FOREIGN PATENT DOCUMENTS

| JP | 04358613 | 11/1992 |
|---|---|---|
| NL | 52259 | 11/1954 |
| WO | 0242183 | 5/2002 |

OTHER PUBLICATIONS

Anonymous, "Bucket Elevator", Jan. 2, 2008, 8 pgs., Germany.

*Primary Examiner* — Gene Crawford
*Assistant Examiner* — Thomas Randazzo
(74) *Attorney, Agent, or Firm* — The Ollila Law Group, LLC

(57) ABSTRACT

A bucket conveyor arrangement having a plurality of bucket conveyor lines (11) arranged alongside one another and having a charging device for charging bulk material onto the bucket conveyor lines (11), wherein a common drive shaft (13) for driving the bucket conveyor lines (11), having in each case a drive motor (17) that is attached to the associated end of the drive shaft (13) and acts on the drive shaft (13), is provided, is characterized in that at least three bucket conveyor lines (11) which are arranged alongside one another and can be coupled to and uncoupled from one or both drive motors (17) in each case individually and separately from one another are provided, wherein the bucket conveyor lines (11) are assigned a common charging device in the form of a bulk-material stream splitter (30) which has a receiving hopper (31) having a central charging point (32) for forming a natural bulk-material cone in the interior of the receiving hopper (31) and also outlets (35) arranged on the receiving hopper (31) on a position line that extends with a radius around the charging point (32) and is located within the natural bulk-material cone that is formed when the bulk-material stream splitter (30) is loaded with bulk material, wherein each outlet (35) is assigned to a bucket conveyor line (11) and can be opened and closed individually by an actuable closure member.

9 Claims, 3 Drawing Sheets

(56) References Cited

U.S. PATENT DOCUMENTS

| | | | |
|---|---|---|---|
| 3,286,816 A * | 11/1966 | Knaust et al. | 198/708 |
| 3,933,236 A * | 1/1976 | Aterianus et al. | 198/418.6 |
| 4,194,300 A * | 3/1980 | Swanson et al. | 34/217 |
| 5,119,939 A * | 6/1992 | Teeter et al. | 198/860.2 |
| 2005/0173226 A1* | 8/2005 | Gold et al. | 198/570 |

* cited by examiner

BUCKET ELEVATOR ARRANGEMENT WITH AT LEAST THREE SEPARATELY OPERATED BUCKET ELEVATOR STRANDS

The instant application should be granted the priority dates of Dec. 2, 2011, the filing date of the corresponding German patent application DE 102011055969.2, as well as Nov. 29, 2012, the filing date of the international patent application PCT/EP2012/073927.

BACKGROUND OT THE INVENTION

The invention relates to a bucket elevator arrangement with several adjacently arranged bucket elevator strands and with a feed device for feeding bulk material to the bucket elevator strands, wherein a common drive shaft with a respective driving motor that is attached to the associated end of the drive shaft and acts upon the drive shaft is provided for driving the bucket elevator strands.

A bucket elevator arrangement with the aforementioned characteristics is shown in the company prospectus "Bucket Elevators" of AUMUND Fördertechnik GmbH, Date of Print 2010, according to which two bucket elevator strands with buckets that are held on bucket elevator chains, preferably plate link chains, are arranged in a common housing. A drive shaft is arranged in the upper head of the double bucket elevator and set in rotation by two driving motors that are realized in the form of electric motors and arranged on both sides of the drive shaft, wherein driving wheels for respectively driving one bucket elevator strand are arranged on said drive shaft and connected thereto in a torque-proof fashion. The buckets with the assigned bucket elevator chains of each bucket elevator strand are respectively guided over a driving wheel that causes the buckets to circulate due to its rotational motion generated by the drive shaft.

Although this double bucket elevator already provides a significant conveying capacity, there is a constant demand for even higher conveying capacities in practical applications. In addition, the known bucket elevator arrangement has the disadvantage that its two bucket elevator strands respectively can only be operated jointly and uniformly such that a required standstill of one bucket elevator strand, in particular, for repair and/or maintenance purposes results in the loss of the entire conveying capacity of the double bucket elevator.

SUMMARY OF THE INVENTION

The invention therefore is based on the objective of realizing a bucket elevator arrangement with the initially cited characteristics in such a way that the capacity of the bucket elevator arrangement is further increased, but a total outage of the bucket elevator arrangement during repair or maintenance times is simultaneously avoided.

The solution to this objective and advantageous embodiments and enhancements of the invention result from the content of the claims that follow this description.

The basic idea of the invention consists of providing at least three adjacently arranged bucket elevator strands that respectively can be coupled to and decoupled from one or both driving motors individually and separately of one another, wherein a common feed device in the form of a bulk material stream splitter is assigned to the bucket elevator strands and features a receiving hopper with a central feed point in order to form a natural bulk material cone in the interior of the receiving hopper, as well as outlets that are arranged on the receiving hopper on a line of position that extends around the feed point with a radius and lies within the natural bulk material cone being formed when the bulk material stream splitter is charged with bulk material, and wherein each outlet is assigned to one bucket elevator strand and can be individually opened and closed by an actuable closure member.

In this respect, the invention with its three bucket elevator strands that are arranged adjacent to one another not only provides a correspondingly higher conveying capacity, but also proposes that the individual bucket elevator strands respectively can be individually coupled to or decoupled from the driving motors such that an individual bucket elevator strand can be selectively shut down for repair or maintenance purposes while the remaining bucket elevator strands remain in operation. Since the arrangement of three adjacent bucket elevator strands also requires a suitable solution on the material feed side, the invention proposes that a common feed device in the form of a bulk material stream splitter, which operates in accordance with the gravimetric principle only, is assigned to the bucket elevator strands and features a receiving hopper with a central feed point in order to form a natural bulk material cone in the interior of the receiving hopper, as well as outlets that are arranged on the receiving hopper in a certain way, wherein each outlet is assigned to one bucket elevator strand and can be individually opened and closed by an actuable closure member. When a bucket elevator strand is shut down, the outlet on the bulk material stream splitter assigned to the respective bucket elevator strand consequently can also be closed such that no bulk material is fed to this bucket elevator strand.

According to a first embodiment of the invention, it is proposed that the drive shaft is divided between the individual bucket elevator strands, wherein the individual shaft sections used for respectively driving one bucket elevator strand can be coupled to and decoupled from one another by means of intermediately arranged controllable coupling devices. For example, if the central bucket elevator strand is shut down in such an embodiment, the two outer bucket elevator strands can be driven by the respective outer driving motors via the assigned shaft sections connected thereto. If an outer bucket elevator strand is shut down, the respective opposite driving motor drives the two remaining shaft sections for the central bucket elevator strand and the outer bucket elevator strand arranged opposite of the bucket elevator strand being shut down.

In an alternative embodiment of the invention, it is proposed that the bucket elevator strands respectively feature a driving wheel that is seated on the drive shaft, and that each driving wheel can be separately coupled to and decoupled from the continuous drive shaft by means of an assigned coupling device. In this case, the drive shaft is realized in a smooth and continuous fashion and the coupling mechanism for coupling and decoupling the individual bucket elevator strands is shifted to the connection between the drive shaft and the respective bucket elevator strand.

To this end, it would be conceivable that each driving wheel is rotatably supported on the drive shaft by means of an inserted wheel bearing, and that the coupling device consists of at least one flange that radially protrudes from the drive shaft and is connected to the drive shaft, wherein said flange can be connected to the driving wheel by means of a fixing device that can be displaced in the axial direction of the drive shaft and engaged with the driving wheel, and wherein it may be advantageous to respectively provide one flange on the drive shaft and to respectively provide one fixing means for connecting each flange to the driving wheel on both sides of each driving wheel. In such an arrangement, the driving wheels assigned to the individual bucket elevator strands therefore can be respectively connected to the rotating drive shaft that is always driven by two driving motors, wherein the drive shaft continues to rotate relative to the decoupled driving wheel in the decoupled state of the drive shaft. Accordingly, suitable measures need to be taken in order to ensure that the driving wheel of the decoupled bucket elevator strand is held in position such that no uncontrolled reverse motion of the bucket elevator chains and the buckets held thereon occurs in the assigned bucket elevator strand.

In such an embodiment, each flange can either form an integral component of the drive shaft or each flange can be displaced on the drive shaft and fixed on the drive shaft in a torque-proof fashion by means of an assigned clamping device.

Since it should be possible, according to the invention, to control the outlets on the bulk material stream splitter that are assigned to the individual bulk material strands, each outlet of the bulk material stream splitter may be provided with a closure member in the form of a plain slide valve that can be moved in the outlet.

In an alternative embodiment of the invention, a closure member in the form of a vertically aligned slide that can be moved into the receiving hopper and the bulk material cone situated therein is respectively arranged between the individual outlets of the bulk material stream splitter in order to separate regions of the bulk material cone assigned to the individual outlets.

BRIEF DESCRIPTION OF THE DRAWINGS

An exemplary embodiment of the invention is illustrated in the drawings and described below. In these drawings.

DETAILED DESCRIPTION OF SPECIFIC EMBODIMENTS

Figure 1:
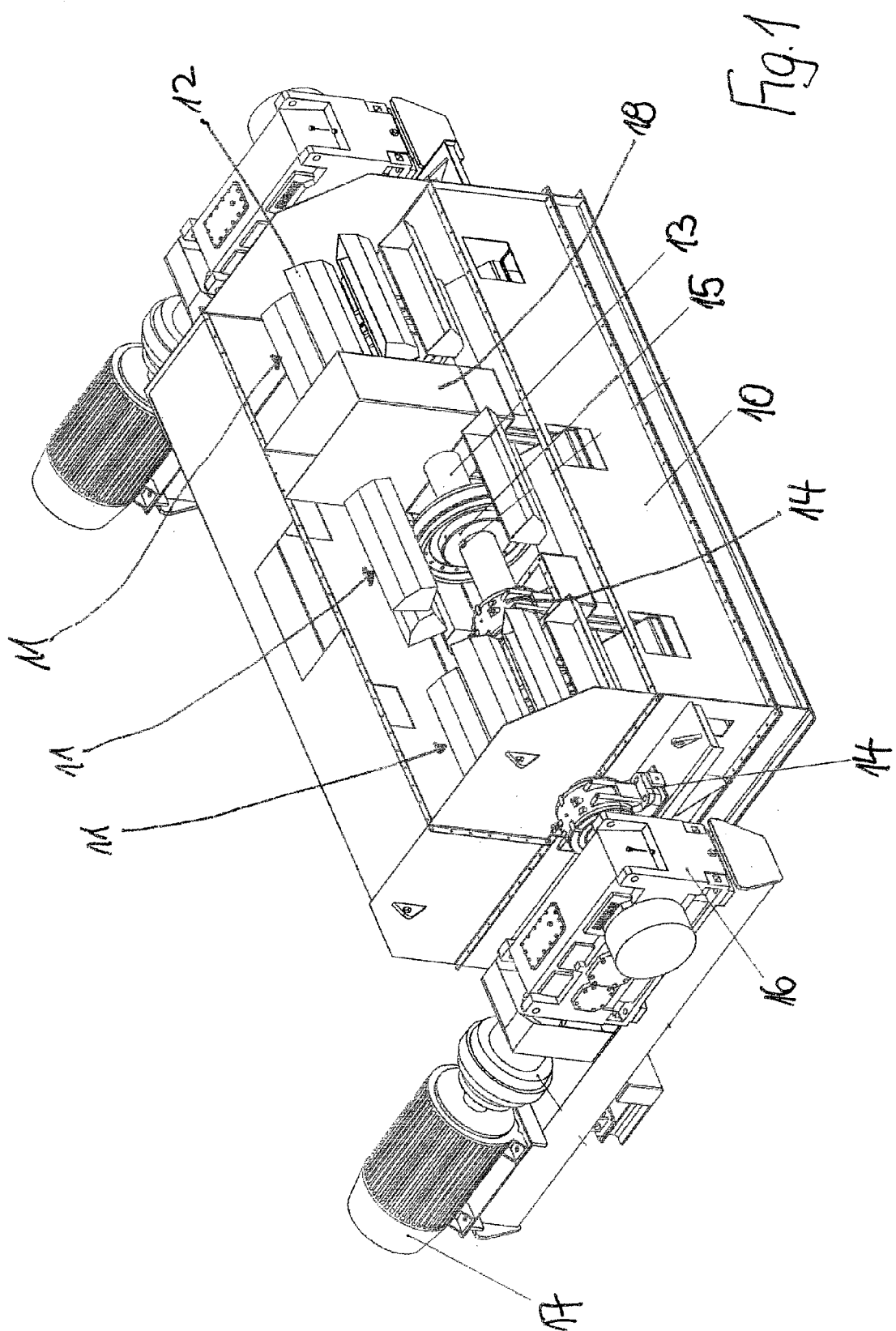
FIG. 1 shows a perspective view of the elevator head of a bucket elevator arrangement with three bucket elevator strands.

FIG. 1 initially shows the upper elevator head of the bucket elevator arrangement with three bucket elevator strands 11, wherein this elevator head features a common housing 10 that accommodates the three bucket elevator strands 11. Each bucket elevator strand 11 comprises buckets 12 that are successively held in a row on bucket elevator chains, wherein these bucket elevator chains are not illustrated in detail in FIG. 1. A common one-piece drive shaft 13 for the three bucket elevator strands 11 extends through the housing 10 and is supported in the housing 10 and outside thereof by means of several plummer block bearings 14. Each bucket elevator strand 11 is assigned a driving wheel 15 for circulating the buckets 12 of each bucket elevator strand 11. A gear unit 16 with a driving motor 17 connected thereto is respectively arranged on both ends of the central drive shaft 13 outside the housing 10. An enclosure 18 arranged in the housing 10 is illustrated on at least one plummer block bearing that supports the drive shaft 13 in order to protect the assigned plummer block bearing 14 against dirt accumulation; the enclosure 18 furthermore makes it possible to cool the plummer block bearing 14 of the drive shaft 13 externally.

Figure 2:
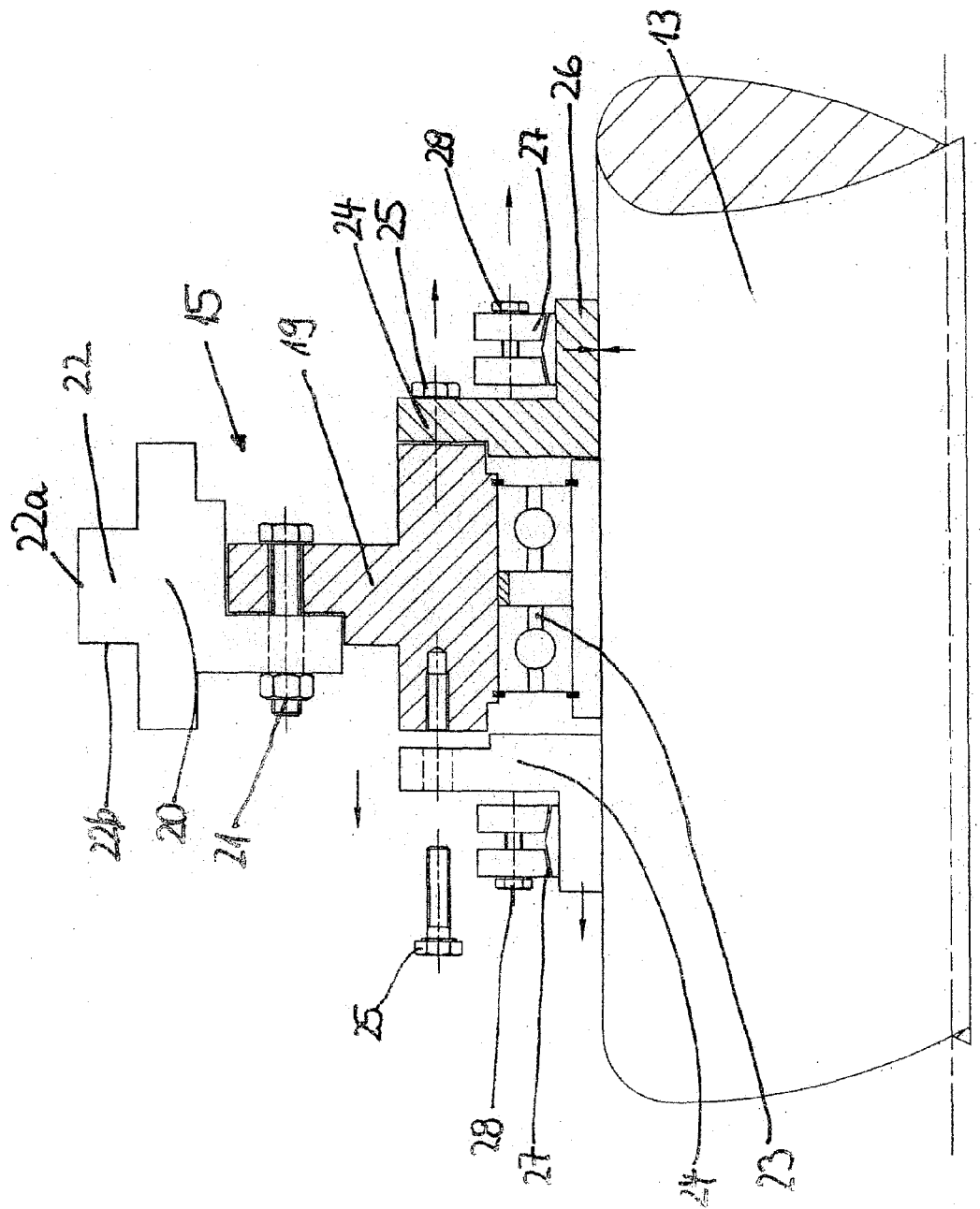
FIG. 2 shows a partial view of the connection of a bucket elevator strand to the drive shaft of the bucket elevator arrangement.

FIG. 2 shows an exemplary embodiment of the coupling and decoupling of a bucket elevator strand 11 to/from the drive shaft 13. To this end, the driving wheel 15 for a bucket elevator strand 11 consists of a hub 19 and a driving ring 20 that is arranged on the outer circumference of the hub 19 and connected thereto with the aid of a fixing means 21. On its outer circumference, the driving ring 20 features a driver 22 that engages into the buckets 12 with its outer face 22a while the invisible chain links of the bucket elevator chains that carry the buckets 12 and are preferably realized in the form of plate link chains adjoin the radial side walls 22b of the driver 22. The hub 19 of the driving wheel 15 is arranged on the drive shaft 13 by means of an intermediately arranged bearing unit 23 in such a way that the drive shaft 13 can rotate relative to the hub 19 and therefore relative to the driving wheel 15 and the bucket elevator strand 11 held by the driving wheel.

Flanges 24 are respectively arranged on the drive shaft 13 on both sides of the driving wheel 15 and can be connected to and disconnected from the hub 19 of the driving wheel 15 with the aid of assigned fixing means 25 in order to transmit the rotational motion of the drive shaft 13 to the driving wheel 15 and to thusly cause the assigned bucket elevator strand 11 to circulate. The two flanges 24 can be respectively connected to the drive shaft 13 in a torque-proof fashion with the aid of a clamping device 27 arranged on an axial neck 26 of each flange 24 by tightening the clamping screw 28 assigned to the clamping device 27.

The rotational motion of the drive shaft 13 is therefore transmitted to the driving wheel 15 when both flanges 24 are connected to the driving wheel 15 with the aid of the fixing means 25 in their position, in which they are connected to the drive shaft 13 in a torque-proof fashion due to the effect of the clamping screw 28 on the clamping device 27. In order to decouple the assigned bucket elevator strand 11 from the drive shaft 13, the fastening means 25 is initially loosened and the clamping screw 28 is subsequently also loosened such that the clamping device 27 is no longer functional. In this position, the two flanges 24 can be separated from the driving wheel 15 and laterally displaced such that the rotational motion of the drive shaft 13 is no longer transmitted to the driving wheel 15. Due to the arrangement of the bearing unit 23, however, the drive shaft 13 can continue to rotate relative to the driving wheel 15 while the driving wheel 15 is fixed in position by the buckets 12 suspended thereon with assigned bucket elevator chains. In this state, it needs to be suitably ensured that a corresponding reverse motion stop is realized in order to prevent the bucket elevator strand 11 from sliding off the driving wheel 15 by turning the driving wheel 15.

Figure 3:
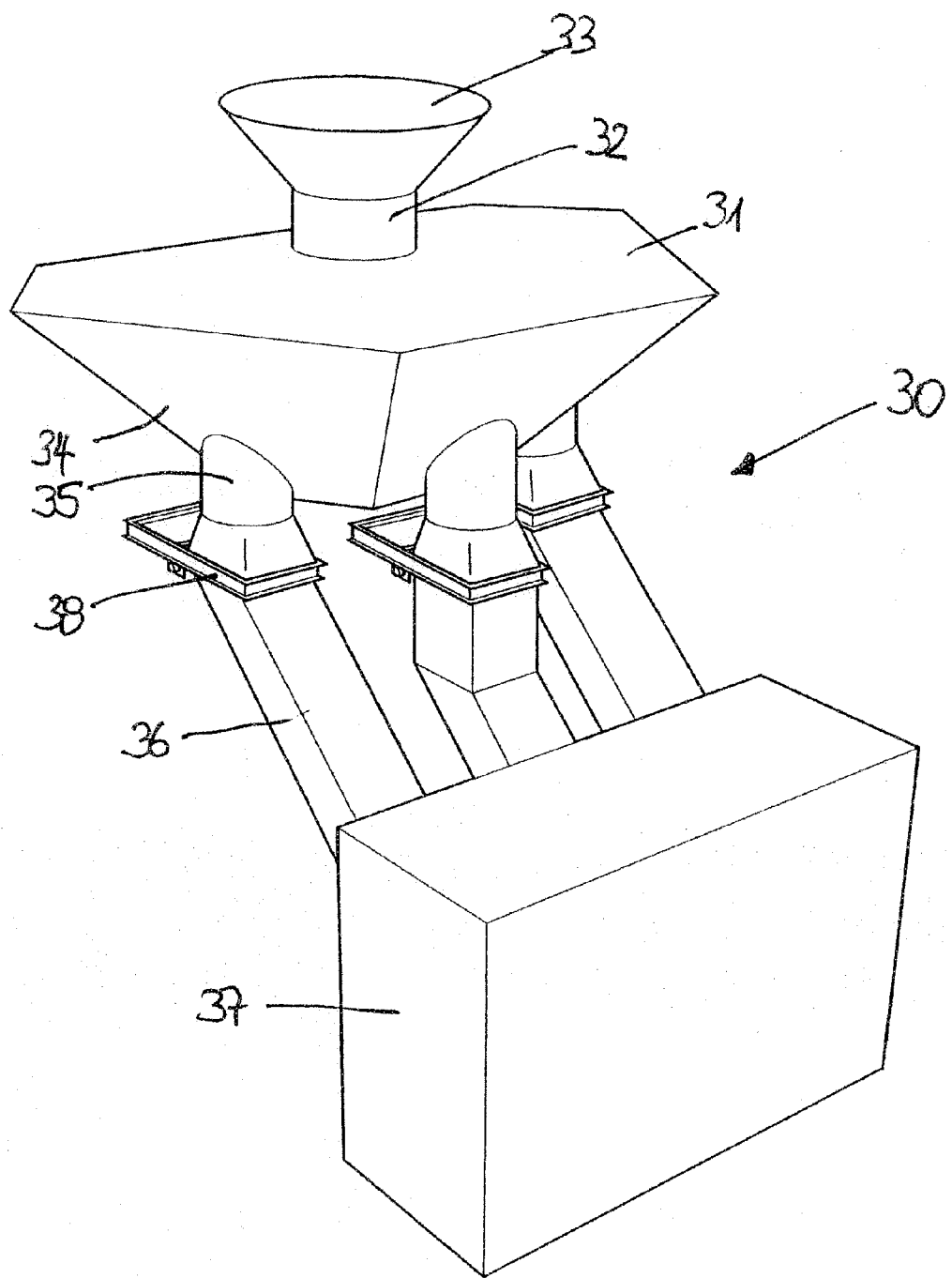
FIG. 3 shows a schematic representation of the feed device for the bucket elevator arrangement in the form of a gravimetric bulk material stream splitter.

Since a common feed device for feeding bulk material to the three bucket elevator strands 11 needs to be provided in the not-shown feed boot of the bucket elevator arrangement, an exemplary embodiment of such a common feed device is illustrated in FIG. 3.

According to the illustration in FIG. 3, the common feed device consists of a gravimetric bulk material stream splitter 30 that in turn consists of a receiving hopper 31, to the upper side of which a central feed point 32 in the form of a hopper 33 is attached.

Since a natural bulk material cone is formed by means of the hopper 33 in the interior of the bulk material stream splitter 30 when it is charged with bulk material, three outlets 35 are arranged in the wall 34 of the bulk material stream splitter 30 in the schematically illustrated exemplary embodiment, wherein a closed chute 36 leading into a transfer box 37 is respectively connected to said outlets. Although not illustrated in greater detail, the three bucket elevator strands 11 of the inventive bucket elevator arrangement exit the transfer box 37 such that the individual bucket elevator strands 11 are filled via the outlets 35 of the bulk material stream splitter 30.

In this respect, it should be noted that the above-described bulk material stream splitter 30 operates according to the gravimetric principle only such that no movable parts need to be provided. Since a natural bulk material cone is formed in the interior of the receiving hopper 31, the outlets 35 are arranged in the wall or walls 34 of the bulk material stream splitter 30 in such a way that the outlets 35 respectively lie within the natural bulk material cone and the bulk material flow supplied via the hopper 33 is automatically divided without the risk of overfilling the individual connected bucket elevator strands 11.

When a bucket elevator strand 11 is decoupled from the drive shaft 13, it can be ensured that the assigned bucket elevator strand 11 is prevented from being filled further by providing the option of blocking the assigned outlet 35 of the bulk material stream splitter 30. In the exemplary solution illustrated in FIG. 4, a plain slide valve 38 is assigned to each outlet 35 and capable of blocking the assigned outlet 35. Alternatively, it would also be conceivable to provide a vertically aligned slide that can be moved into the receiving hopper 31 and the bulk material cone situated therein in order to separate regions of the bulk material cone assigned to the individual outlets 35 because the natural bulk material cone in the interior of the receiving hopper 31 is hardly impaired in this case.

The characteristics of the object of this document disclosed in the preceding description, the claims, the abstract and the drawings may be essential for realizing the different embodiments of the invention individually, as well as in arbitrary combinations.

The specification incorporates by reference the disclosure of German patent Application DE 10 2011 055 969.8, filed Dec. 2, 2011, as well as PCT/EP2012/073927, filed Nov. 29, 2012.

The present invention is, of course, in no way restricted to the specific disclosure of the specification and drawings, but also encompasses any modifications within the scope of the appended claims.

The invention claimed is:

1. A bucket elevator arrangement, comprising:
    a plurality of adjacently arranged bucket elevator strands (11);
    a feed device for feeding bulk material to the bucket elevator strands (11);
    a common drive shaft (13) with at least one driving motor (17) that is attached to an associated end of the drive shaft (13) and acts upon the drive shaft (13) for driving the bucket elevator strands (11);
    at least three adjacently arranged bucket elevator strands (11) that can be coupled to and decoupled, respectively, from one or both driving motors (17) individually and separately of one another;
    a common feed device in the form of a bulk material stream splitter (30) assigned to the bucket elevator strands (11) and having a receiving hopper (31) with a central feed point (32) in order to form a natural bulk material cone in the interior of the receiving hopper (31);
    outlets (35) arranged on the receiving hopper (31) on a line of position that extends around the feed point (32) with a radius and lies within the natural bulk material cone being formed when the bulk material stream splitter (30) is charged with bulk material, and wherein each outlet (35) is assigned to one bucket elevator strand (11) and can be individually opened and closed by an actuatable closure member.

2. The bucket elevator arrangement according to claim 1, wherein the drive shaft (13) is divided between the individual bucket elevator strands (11), wherein the individual shaft sections used for respectively driving one bucket elevator strand (11) can be coupled to and decoupled from one another by means of intermediately arranged controllable coupling devices.

3. The bucket elevator arrangement according to claim 1, wherein the bucket elevator strands (11) respectively each include a driving wheel (15) that is seated on the drive shaft (13), wherein each driving wheel (15) can be separately coupled to and decoupled from the continuous drive shaft (13) by means of an assigned coupling device.

4. The bucket elevator arrangement according to claim 3, wherein each driving wheel (15) is rotatably supported on the drive shaft (13) via an inserted wheel bearing (23), and wherein the coupling device consists of at least one flange (24) that radially protrudes from the drive shaft (13) and is connected to the drive shaft (13), wherein said flange can be connected to the driving wheel (15) with the aid of a fixing mechanism (25) that can be displaced in the axial direction of the drive shaft (13) and engaged with the driving wheel (15).

5. The bucket elevator arrangement according to claim 4, wherein one flange (24) is respectively provided on the drive shaft (13) and one fixing mechanism (25) for connecting each flange (24) to the driving wheel (15) is respectively provided on both sides of each driving wheel (15).

6. The bucket elevator arrangement according to 4, wherein each flange (24) forms an integral component of the drive shaft (13).

7. The bucket elevator arrangement according to claim 4, wherein each flange (24) is displaceable on the drive shaft (13) and fixed on the drive shaft in a torque-proof fashion via an assigned clamping device (27).

8. The bucket elevator arrangement according to claim 1, wherein each outlet (35) of the bulk material stream splitter (30) is provided with a closure member in the form of a plain slide valve (38) that can be moved in the outlet (35).

9. The bucket elevator arrangement according to claim 1, further comprising a closure member in the form of a vertically aligned slide that is movable into the receiving hopper (31), wherein the bulk material cone situated therein is respectively arranged between the (35) of the bulk material stream splitter (30) in order to separate regions of the bulk material cone assigned to the individual outlets (35).

* * * * *